March 14, 1939.  G. C. FAIRBAIRN  2,150,545
TESTING DEVICE
Filed June 30, 1937
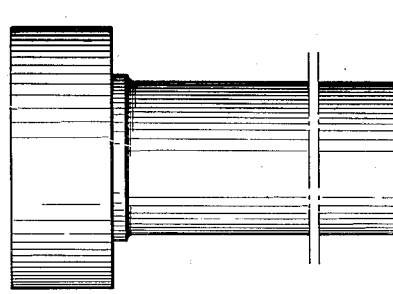
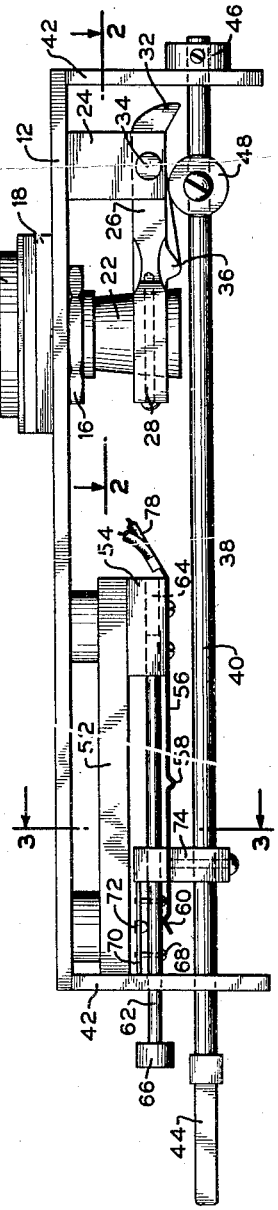
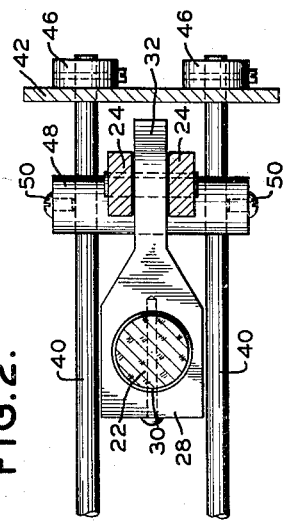
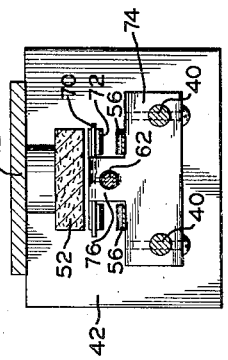
GEORGE C. FAIRBAIRN
INVENTOR
BY *R. J. Dearborn*
ATTORNEY Patented Mar. 14, 1939

2,150,545

UNITED STATES PATENT OFFICE 2,150,545

TESTING DEVICE

George C. Fairbairn, Port Arthur, Tex., assignor to The Texas Company, New York, N. Y., a corporation of Delaware Application June 30, 1937, Serial No. 151,290

7 Claims. (Cl. 265—11)

This invention relates to testing apparatus and more particularly to a device for simultaneously opening a tube or vessel containing fluid the viscosity of which is to be tested, and starting a timing mechanism for indicating the time of duration of the test. The principal object of the invention is to provide a device by means of which these operations will be accomplished at exactly the same instant and with a minimum of effort.

In the testing of the viscosity of a liquid by means of an instrument such as a Saybolt viscosimeter, it has been the custom to remove the cork or other stopper from the viscosimeter tube with one hand while starting a stop watch or other timing mechanism with the other. It has thus been quite improbable that the timing device would be started at exactly the same instant as the start of flow of the liquid to be tested and the results of the test might thus include appreciable errors.

In accordance with the present invention, a device is provided for use with a tube, bottle or other vessel containing the liquid to be tested and by means of which the cork or stopper is removed from the vessel at the exact instant that a timing device is started. The movement of a plunger in one direction causes a pivoted lever to pull the stopper from the vessel and the plunger simultaneously engages the contact device for closing an electrical circuit for starting the timing mechanism. After the desired quantity of liquid has flowed from the vessel, the movement of a second plunger breaks the electrical circuit and thus stops the timing mechanism. After the test has been completed, movement of the first mentioned plunger in the reverse direction reinserts the stopper in the vessel and moves the second plunger back to its original position to be in readiness for the next test.

For a better understanding of the invention, reference may be had to the accompanying drawing in which Figure 1 is an elevation of the device shown as connected to a Saybolt viscosimeter tube;

Figure 2 is a sectional plan view taken on line 2—2 of Figure 1 looking in the direction of the arrows, while Figure 3 is a sectional view taken through the apparatus on the line 3—3 looking toward the left as indicated by the arrows in Figure 1.

Referring to the drawing, the device is shown as applied to a Saybolt viscosimeter tube 10 and comprises a base member 12 secured to the neck 14 of the tube as by means of a nut 16. One or more relatively soft washers or gaskets 18 may be placed between the base 12 and a nut or rim 20 secured to the neck 14. The neck 14 may contain a suitable orifice, not shown, through which the liquid flows from the tube after the cork or stopper 22 has been removed.

A pair of brackets 24 secured to the base 12 have pivotally mounted therebetween an arm 26. The arm 26 is provided at one end with an enlarged head 28, this head containing an opening 30 of a size suitable to fit snugly around the cork or stopper 22. At the end of the arm 26 opposite the head 28 is a depending lug 32 and between the pivot 34 and the head 28 on the underside of the arm 26 is a projection or cam 36.

A plunger 38 comprising a pair of parallel rods 40 is mounted for slidable longitudinal movement in a pair of brackets or end plates 42 secured to the opposite ends of the base 12. A handle 44 is secured to the left hand ends of the plunger rods 40 and a pair of stop members 46 are secured to the other ends of the plunger rods. A cross bar 48 is secured to the rods 40 as by means of screws 50 and is positioned so that it will be normally below and in contact with the underside of the pivoted arm 26. As will be observed with reference to Figure 1, when the plunger 38 is moved toward the right the bar 48 engages the lug 32 moving the arm 26 in a counterclockwise direction about the pivot 34, thus pulling the stopper 22 from the tube neck 14. Movement of the plunger 40 toward the left will cause the bar 48 to engage the cam 36, thus moving the arm clockwise about the pivot 34 and causing the stopper 22 to be reinserted in the tube neck 14.

In order to start the timing mechanism simultaneously with the withdrawal of the stopper 22, an electrical contact device shown at the left in Figure 1 is provided. A bracket member 52 suitably secured to the underside of the base 12 has mounted on one end thereof a block 54 of electrically insulating material and attached to this block are a pair of spring contact members 56. The springs 56 are disposed in parallel and each spring is provided near its center with a depending hump 58 and at its outer or free end with a bent portion 60. A plunger rod 62 is slidably mounted between the end plate 42 and the block 54, the end of the rod being slidably supported in an opening 64 in the block 54 and the left hand end of the rod is provided with a suitable button or head 66. Secured to the plunger rod 62 as by means of screws 68 is a plate 70 of electrically insulating material, and attached to the plate 70 and disposed above and at right angles to the rod 62 is a metallic contact member 72. Suitably secured to the plunger rods 40 is an insulating block 74 of the shape of an inverted T, the upwardly projecting center portion 76 of the block being provided with an opening through which the plunger rod 62 may pass freely. The horizontal portion of the block 74 is disposed directly below and preferably in contact with the undersides of the contact springs 56.

The insulating block 74 is so spaced on the plunger rods 40 that it will engage the humps 58 of the contact springs 56 at exactly the same instant that the bar 48 engages the lug 32 to remove the stopper 22 from the tube neck 14. As the block 74 engages the humps 58 the ends 60 of the contact springs 56 will move upwardly and strike the contact bar 72, thus completing an electrical circuit including the two contact springs 56, the contact 72 and the wires 78. Although the timing mechanism and the remainder of the electrical circuit are not shown, it is intended that the timer will be any suitable mechanism which can be started on closing an electrical circuit and which will stop when that circuit is broken.

In operation, the tube 10 will be filled with the proper quantity of liquid, the viscosity of which is to be measured and the plunger rods 40 and 62 will be in the position shown in Figure 1. When it is desired to start the test the handle 44 is grasped and the plunger 38 pushed toward the right. The bar 48 will engage the lug 32 to cause the arm 26 to pull stopper 22 from the tube neck and at the same instant the horizontal portion of the block 64 will engage the humps 58 of the contact springs 56, causing the ends 60 of the springs to move into contact with the contact bar 72, completing the circuit and starting the timing device, not shown. When a sufficient quantity of the liquid has flown from the tube 10, the plunger 62 will be pushed to the right thus moving the contact bar 72 from engagement with the spring ends 60, breaking the electrical circuit and stopping the timing mechanism. When it is desired to run another test the plunger 38 may be pulled to the left whereupon the bar 48 will engage the projection 36 of the arm 26 causing the stopper 22 to be reinserted in the tube neck 14. On this leftward movement the upper portion 76 of the block 64 will engage the insulating plate 70, thus returning the plunger 62 to its original position, as shown in Figure 1, with the contact bar 72 above but out of contact with the ends 60 of the springs 56.

It will thus be seen that a device has been provided by means of which a timing mechanism will be started at the exact instant the stopper is removed from a testing tube or vessel. Furthermore, with this device it is not necessary for the operator to risk burning his fingers since he does not need to reach under the tube to reinsert the stopper therein. Although the device is shown as applied to a Saybolt viscosimeter tube, it is obvious that any other type of vessel may be used and tests other than those for determining viscosity may be run.

Obviously many modifications and variations of the invention may be made without departing from the spirit and scope thereof, and therefore only such limitations should be imposed as are indicated by the appended claims.

I claim:

1. In a device for removing a closure from a vessel and simultaneously therewith closing an electric circuit, a base secured to said vessel, an arm movably mounted on said base and secured to said closure, a pair of electric contact members mounted on said base, a fixed contact disposed in a position to be engaged by said first mentioned contact members to close said electric circuit, and a plunger slidably mounted on said base and adapted when moved in one direction to strike said arm to remove said closure and simultaneously therewith to move said first mentioned contacts into engagement with said fixed contact.

2. In combination with a testing apparatus, said apparatus including a stoppered vessel containing liquid to be tested, and a timing mechanism, means for removing the stopper from said vessel and simultaneously therewith starting said timing mechanism comprising a base secured to said vessel, an arm attached to said stopper and pivotally mounted on said base, a projection on said arm, contact members supported by said base and in electrical circuit with said timing mechanism, projections on said contact members, a plunger slidably mounted on said base and adapted when moved in one direction to engage the projection on said arm to rotate said arm to remove said stopper and to simultaneously engage the projections on said contacts to close said electric circuit.

3. In a device for removing a closure from a vessel and simultaneously therewith closing an electric circuit, a base secured to said vessel, an arm pivotally mounted on said base and secured at one end to said closure, a projection on the other end of said arm, a pair of spring contact members secured at one end to said base, a fixed contact disposed in a position to be engaged by the other ends of said spring contacts to close said electric circuit, said spring contacts being provided with projections, and a plunger slidably mounted on said base and adapted when moved in one direction to engage simultaneously the projection on said arm and the projections on said spring contact members to remove said closure and to close said electric circuit respectively.

4. In a device for removing a closure from a vessel and simultaneously therewith closing an electric circuit, a base secured to said vessel, an arm pivotally mounted on said base and secured to said closure, contact means associated with said electric circuit and mounted on said base, said arm being provided with a projection at the end opposite said closure and with a cam, a plunger slidably mounted on said base, a bar on said plunger, the arrangement being such that movement of said plunger in one direction will cause said bar to engage the projection on said arm to rotate said arm to remove the closure from the vessel and simultaneously therewith to engage said contact means to close said electric circuit, while movement of said plunger in the opposite direction will cause said bar to engage said cam to rotate said arm in the reverse direction to replace the closure in the vessel.

5. In a device for removing a closure from a vessel and simultaneously therewith closing an electric circuit, a base secured to said vessel, an arm pivotally mounted on said base and secured to said closure, a pair of spring contact members mounted on said base, a fixed contact disposed in a position to be engaged by said spring contact members to close said electric circuit, a plunger slidably mounted on said base and adapted when moved in one direction to strike said arm to remove said closure and simultaneously therewith to strike and move said spring contacts into engagement with said fixed contact, and a second plunger slidably mounted on said base and connected to said fixed contact so that movement of said second plunger in one direction will disengage said fixed contact from said first mentioned contact members to open said electric circuit.

6. In a device for removing a closure from a vessel and simultaneously therewith closing an electric circuit, a base secured to said vessel, an arm pivotally mounted on said base and secured at one end to said closure, a projection on said arm, a pair of spring contact members secured at one end to said base, a member slidably mounted on said base, a third contact member secured to said slidable member normally in a position to be engaged by the other ends of said spring contacts to close said electric circuit, said spring contacts being provided with projections, and a plunger slidably mounted on said base and adapted when moved in one direction to engage simultaneously the projection on said arm and the projections on said spring contact members to rotate the arm to remove said closure and to close said electric circuit respectively, the arrangement being such that subsequent movement of said slidable member will disengage said third contact from said spring contacts to open said electric circuit.

7. In a device for removing a closure from a vessel and simultaneously therewith closing an electric circuit, a base secured to said vessel, an arm pivotally mounted on said base and secured at one end to said closure, a projection on the other end of said arm, a cam member on said arm, a pair of spring contact members secured at one end to said base, a member slidably mounted on said base, a third contact member secured to said slidable member normally in a position to be engaged by the other ends of said spring contacts to close said electric circuit, said spring contacts being provided with projections, and a plunger slidably mounted on said base and adapted when moved in one direction to engage simultaneously the projection on said arm and the projections on said spring contact members to rotate the arm to remove said closure and to close said electric circuit respectively, the arrangement being such that movement of said slidable member will disengage said third contact from said spring contacts to open said electric circuit, while movement of said plunger in the reverse direction will cause said cam to be engaged so as to rotate the arm to replace said closure and to return said slidable member to its original position.

GEORGE C. FAIRBAIRN.